(12) United States Patent
Chang et al.

(10) Patent No.: US 12,727,530 B2
(45) Date of Patent: Sep. 8, 2026

(54) ENVIRONMENT MAINTENANCE SYSTEM AND WEEDER ROBOT

(71) Applicant: PIXART IMAGING INC., Hsin-Chu (TW)

(72) Inventors: Yen-Min Chang, Hsin-Chu (TW); Shih-Feng Chen, Hsin-Chu (TW); Han-Lin Chiang, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 496 days.

(21) Appl. No.: 18/219,757

(22) Filed: Jul. 10, 2023

(65) Prior Publication Data

US 2025/0017138 A1 Jan. 16, 2025

(51) Int. Cl.
*A01D 34/78* (2006.01)
*A01D 34/00* (2006.01)
(Continued)

(52) U.S. Cl.
CPC ........... *A01D 34/008* (2013.01); *A01D 34/78* (2013.01); *A47L 9/2805* (2013.01); *A47L 9/2842* (2013.01); *A47L 9/2852* (2013.01); *A47L 9/2873* (2013.01); *A47L 9/2894* (2013.01); *G05D 1/0088* (2013.01); *G05D 1/0225* (2013.01); *G05D 1/0259* (2013.01); *A01D 2101/00* (2013.01); *A47L 2201/022* (2013.01); *A47L 2201/04* (2013.01); *A47L 2201/06* (2013.01)

(58) Field of Classification Search
CPC ..... A01D 34/78; A47L 9/2873; A47L 9/2894; A47L 2201/022; G01D 1/0259
See application file for complete search history.

(56) References Cited

U.S. PATENT DOCUMENTS 5,600,943 A * 2/1997 Ryan .................... A01D 34/661 56/2
5,652,489 A * 7/1997 Kawakami ........... G05D 1/0242 901/3

(Continued)

FOREIGN PATENT DOCUMENTS

CN 109960253 B * 9/2022 ............. A01D 43/14
WO WO-2021067757 A1 * 4/2021 ............. G06Q 10/20

OTHER PUBLICATIONS

English Translation of CN-109960253-B (Year: 2022).*

*Primary Examiner* — Claude J Brown
(74) *Attorney, Agent, or Firm* — Li & Cai Intellectual Property (USA) Office

(57) ABSTRACT

A weeder robot includes a movable carrier and a blade module assembled to the movable carrier. The movable carrier includes a map creating module and a control module that is electrically coupled to the blade module and the map creating module. The map creating module includes an infrared unit and a vision sensing unit. The infrared unit can emit and receive an infrared light. The vision sensing unit can obtain an image information in a non-contact manner. The movable carrier can be used to move in a court, so that the map creating module can generate a three-dimensional (3D) court map through cooperation between the infrared unit and the vision sensing unit. When the weeder robot performs a maintenance process, the control module drives the blade module to weed a portion of a lawn higher than a predetermined height according to the 3D court map.

19 Claims, 12 Drawing Sheets

(51) Int. Cl.

| | |
|---|---|
| ***A47L 9/28*** | (2006.01) |
| ***G05D 1/00*** | (2006.01) |
| *A01D 101/00* | (2006.01) |

(56) References Cited

U.S. PATENT DOCUMENTS

| | | | | |
|---|---|---|---|---|
| 10,637,683 | B2 * | 4/2020 | Funk | G01C 21/3415 |
| 11,199,853 | B1 * | 12/2021 | Afrouzi | B25J 13/006 |
| 2003/0023356 | A1 * | 1/2003 | Keable | G05D 1/027 701/532 |
| 2015/0194127 | A1 * | 7/2015 | Fiedler | H04L 12/283 345/690 |
| 2016/0014956 | A1 * | 1/2016 | Matsumoto | A01D 34/64 56/10.2 A |
| 2016/0113195 | A1 * | 4/2016 | Das | G05D 1/0265 701/25 |
| 2018/0035606 | A1 * | 2/2018 | Burdoucci | A01D 34/008 |
| 2020/0201328 | A1 * | 6/2020 | Abramson | G05D 1/243 |
| 2021/0055703 | A1 * | 2/2021 | Kim | B05B 12/004 |
| 2022/0107648 | A1 * | 4/2022 | Ratanaphanyarat | A47L 9/2831 |
| 2022/0254004 | A1 * | 8/2022 | Shayne | H04N 7/188 |
| 2022/0287229 | A1 * | 9/2022 | Honji | A01D 34/78 |
| 2023/0042867 | A1 * | 2/2023 | Degnan | A01D 34/863 |
| 2023/0210049 | A1 * | 7/2023 | Chen | A01D 34/008 56/10.2 A |

* cited by examiner 100
300a
300
301
2
21

ENVIRONMENT MAINTENANCE SYSTEM AND WEEDER ROBOT

FIELD OF THE DISCLOSURE

The present disclosure relates to a weeder robot, and more particularly to an environment maintenance system and a weeder robot each being able to establish a three-dimensional (3D) court map in a contactless manner.

BACKGROUND OF THE DISCLOSURE

When a conventional weeder robot is used to cut weed on a lawn, objects to be cut cannot be judged or identified by the conventional weeder robot, such that wrong objects (e.g., seedlings) may be mistakenly cut by the conventional weeder robot to cause an undesired result.

SUMMARY OF THE DISCLOSURE

In response to the above-referenced technical inadequacies, the present disclosure provides an environment maintenance system and a weeder robot for effectively improving on the issues associated with conventional weeder robots.

In order to solve the above-mentioned problems, one of the technical aspects adopted by the present disclosure is to provide an environment maintenance system for being applied to a building and a court that is located around the building. The environment maintenance system includes a charging station, a blade module disposed in and charged from the charging station, and a movable carrier being capable of having the blade module assembled thereon from the charging station for being jointly defined as a weeder robot. The movable carrier includes a control module electrically coupled to the blade module and a map creating module that is electrically coupled to the control module. The map creating module includes an infrared unit and a vision sensing unit. The infrared unit is configured to emit an infrared light in a predetermined area and is configured to receive the infrared light reflected from the predetermined area. The vision sensing unit is configured to obtain an image information in a non-contact manner. The map creating module is capable of determining a topography of environment and heights of objects in the predetermined area through a cooperation between the infrared light received by the infrared unit and the image information obtained by the vision sensing unit. When the movable carrier is moved in the court according to a predetermined schedule, the map creating module is configured to generate a three-dimensional (3D) court map corresponding to the court through the cooperation between the infrared unit and the vision sensing unit. When the weeder robot performs a maintenance process in the court according to the predetermined schedule, the control module is configured to drive the blade module to weed a portion of a lawn higher than a predetermined height according to the 3D court map.

In certain embodiments, the movable carrier includes a humidity sensor electrically coupled to the control module and configured to detect an environment humidity of the court. When the environment humidity is greater than a first humidity that represents impending rain, the weeder robot is stopped to perform the maintenance process.

In certain embodiments, the environment maintenance system further includes a sprinkler module disposed in and charged from the charging station. When the environment humidity is less than a second humidity that represents excessive dryness, the movable carrier is operated to replace the blade module with the sprinkler module from the charging station for being jointly defined as a sprinkler robot, where the sprinkler module is electrically coupled to the control module, and the sprinkler robot is configured to perform a sprinkling process to the lawn in the court through the sprinkler module.

In certain embodiments, the environment maintenance system further includes a cleaning module disposed in and charged from the charging station. The movable carrier is configured to replace the blade module with the cleaning module from the charging station for being jointly defined as a robot vacuum cleaner. The cleaning module is electrically coupled to the control module, and the robot vacuum cleaner is configured to perform a cleaning process in the building through the cleaning module.

In certain embodiments, the environment maintenance system further includes a monitor for being electrically coupled to a local area network of the building. The movable carrier includes a wireless connection unit configured to be electrically coupled to the local area network for receiving information of the court obtained from the monitor.

In certain embodiments, the movable carrier includes a wireless connection unit configured to be electrically coupled to an external apparatus, so that the 3D court map is editable from the external apparatus.

In certain embodiments, a quantity of the weeder robot in the environment maintenance system is more than one. Moreover, regions on the 3D court map to be weeded are defined and distributed according to electricity of the weeder robots, and the weeder robots are configured to respectively weed different portions of the lawn that are higher than the predetermined height and that respectively correspond to the regions on the 3D court map to be weeded.

In certain embodiments, the environment maintenance system further includes a plurality of antenna tags disposed on the court and spaced apart from each other. The antenna tags jointly define a maintenance boundary, and the weeder robot is not in contact with the maintenance boundary.

In certain embodiments, after the weeder robot performs the maintenance process, the movable carrier is moved in the court to update the 3D court map.

In certain embodiments, the weeder robot is configured to perform a patrol process in the court according to the predetermined schedule, thereby synchronously updating the 3D court map.

In certain embodiments, the blade module includes a plurality of blades located at different heights, and the control module is configured to select one of the blades to perform the maintenance process according to the predetermined height.

In order to solve the above-mentioned problems, another one of the technical aspects adopted by the present disclosure is to provide a weeder robot, which includes a movable carrier and a blade module. The movable carrier includes a control module and a map creating module that is electrically coupled to the control module. The map creating module includes an infrared unit and a vision sensing unit. The infrared unit is configured to emit an infrared light in a predetermined area and is configured to receive the infrared light reflected from the predetermined area. The vision sensing unit is configured to obtain image information in a non-contact manner. The map creating module is capable of determining a topography of environment and heights of objects in the predetermined area through a cooperation between the infrared light received by the infrared unit and the image information obtained by the vision sensing unit. When the movable carrier is moved in a court according to a predetermined schedule, the map creating module is configured to generate a three-dimensional (3D) court map corresponding to the court through the cooperation between the infrared unit and the vision sensing unit. The blade module is assembled to the movable carrier and is electrically coupled to the control module. When the weeder robot performs a maintenance process in the court according to the predetermined schedule, the control module is configured to drive the blade module to weed a portion of a lawn higher than a predetermined height according to the 3D court map.

In certain embodiments, after the weeder robot performs the maintenance process, the movable carrier is moved in the court to update the 3D court map.

In certain embodiments, the weeder robot is configured to perform a patrol process in the court according to the predetermined schedule, thereby synchronously updating the 3D court map.

In certain embodiments, the blade module includes a plurality of blades located at different heights, and the control module is configured to select one of the blades to perform the maintenance process according to the predetermined height.

In certain embodiments, the control module is configured to adjust a weeding orientation of the blade module according to predetermined height.

In certain embodiments, the infrared unit is rotatably assembled to the movable carrier. When the map creating module is operated to detect the topography of the environment, the infrared unit emits the infrared light by a first angle. When the map creating module is operated to detect the heights of the objects, the infrared unit emits the infrared light by a second angle that is different from the first angle.

In certain embodiments, the vision sensing unit includes at least two of an image sensing mechanism, a simultaneous localization and mapping (SLAM) mechanism, an image segmentation mechanism, a structural light sensing mechanism, a mmWave sensing mechanism, an ultrasonic sensing mechanism, a driver monitoring system (DMS) mechanism, a time of flight (TOF) mechanism, and a stereo vision sensing mechanism.

In certain embodiments, the vision sensing unit includes one of an image sensing mechanism, a SLAM mechanism, an image segmentation mechanism, and a structural light sensing mechanism. The vision sensing unit further includes one of a mmWave sensing mechanism, an ultrasonic sensing mechanism, and a DMS mechanism.

In certain embodiments, the movable carrier includes a humidity sensor electrically coupled to the control module and configured to detect an environment humidity of the court. When the environment humidity is greater than a first humidity that represents impending rain, the weeder robot is stopped to perform the maintenance process.

Therefore, the movable carrier (or the weeder robot) in the present disclosure can generate the 3D court map in the non-contact manner (e.g., the optical manner), thereby effectively preventing the movable carrier (or the weeder robot) from damaging objects (e.g., seedlings) in the court that are under protection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
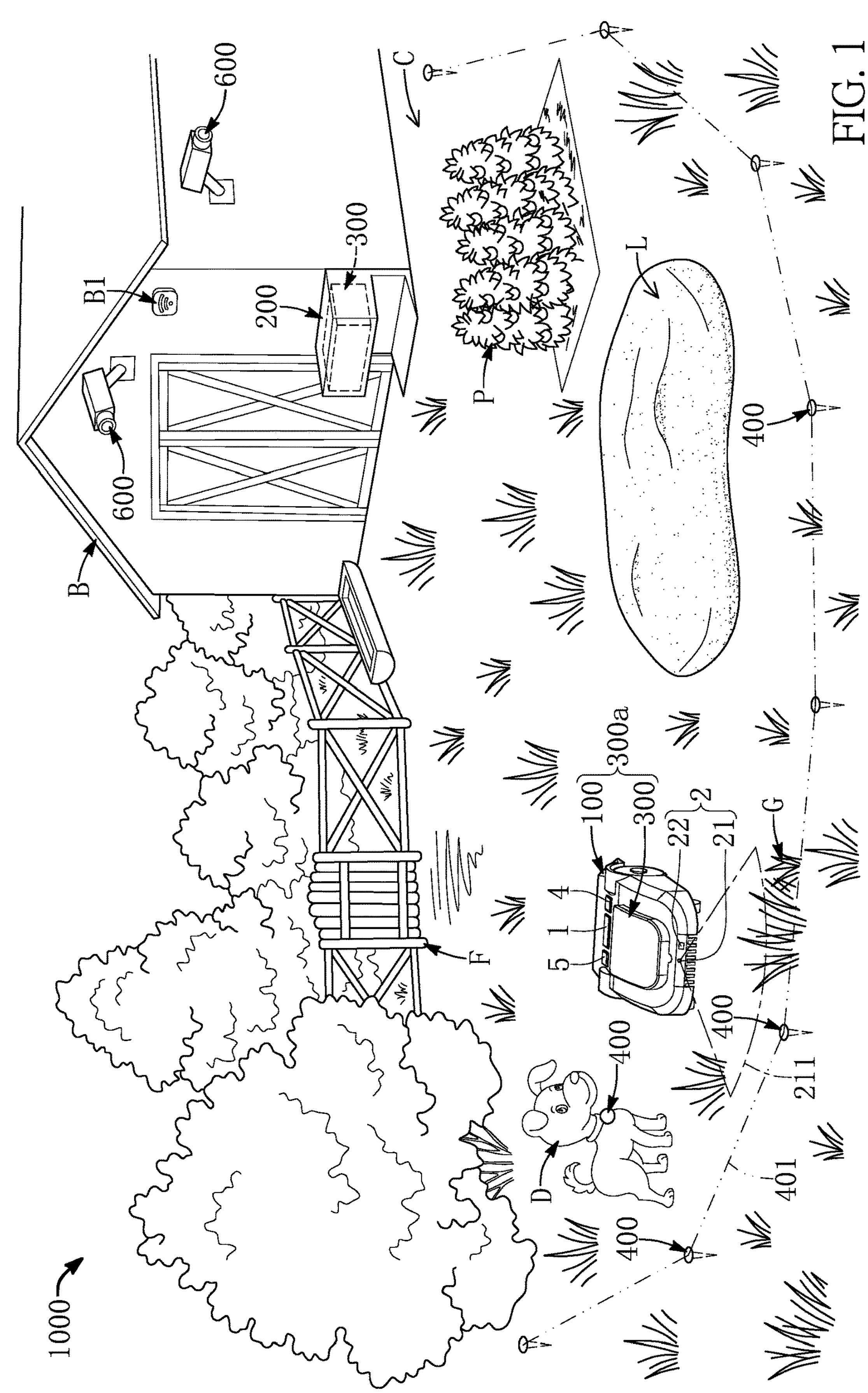
FIG. 1 is a schematic perspective view of an environment maintenance system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
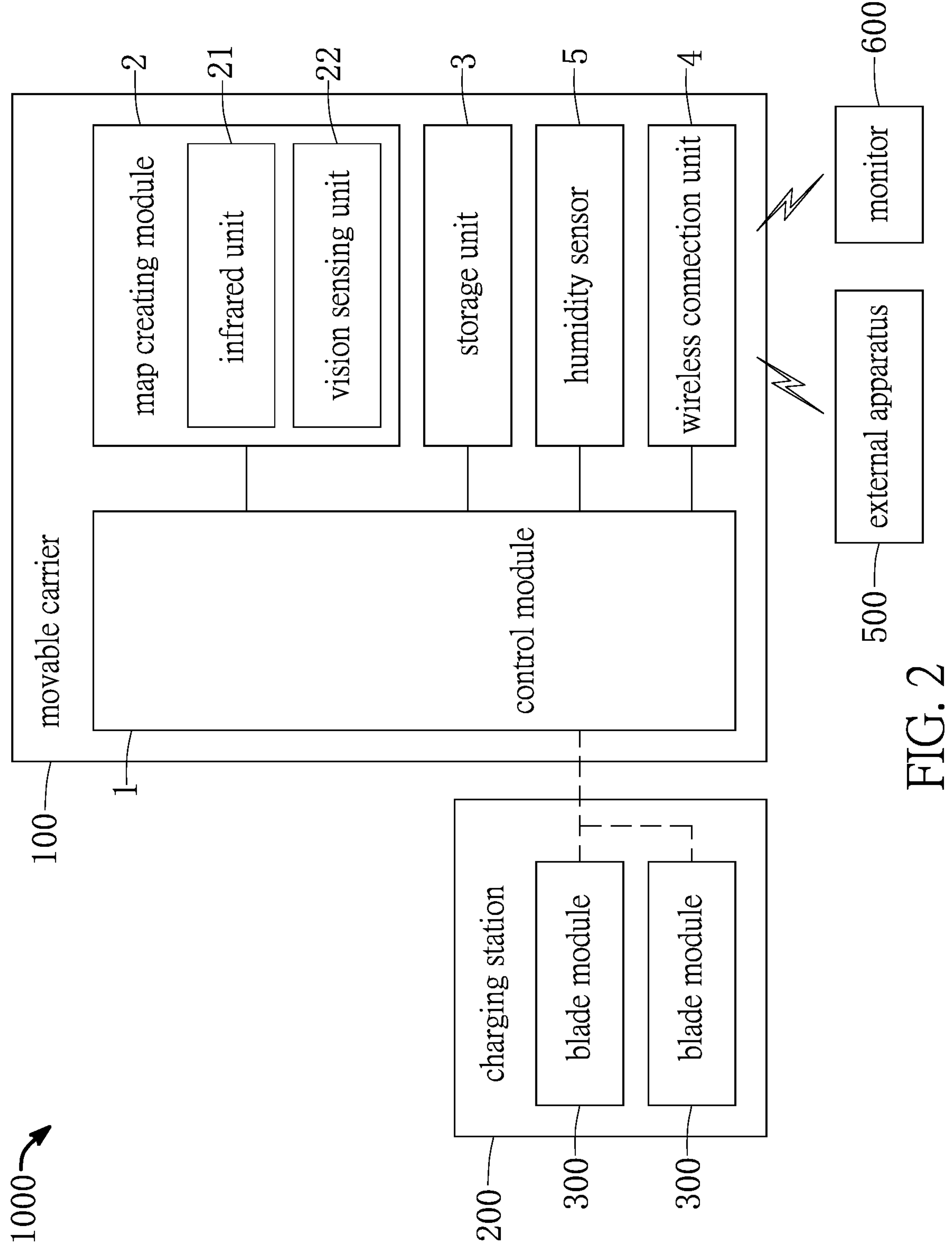
FIG. 2 is a schematic functional block diagram of the environment maintenance system according to the first embodiment of the present disclosure.
Figure 3:
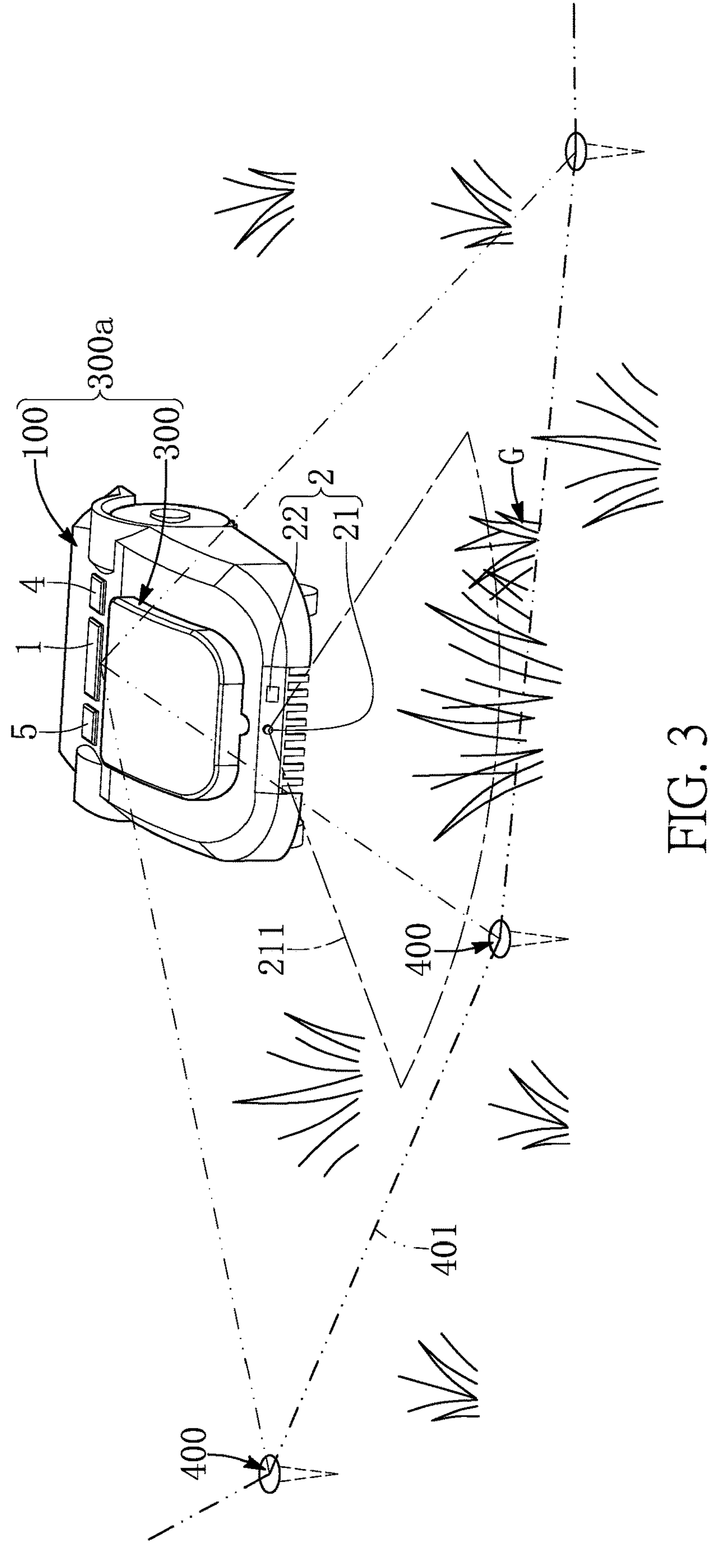
FIG. 3 is a schematic perspective view showing an operation of a weeder robot of FIG. 1.

Referring to FIG. 1 to FIG. 8, a first embodiment of the present disclosure is provided. As shown in FIG. 1 to FIG. 3, the present embodiment provides an environment maintenance system 1000 for being applied to a building B and a court C (hereafter can be referred to as a yard C) that is located around the building B. The court C in the present embodiment is a garden, but the present disclosure is not limited thereto. For example, in other embodiments of the present disclosure not shown in the drawings, the court C can be a playground or other places having a lawn G.

The environment maintenance system 1000 includes a charging station 200, a blade module 300 disposed in the charging station 200, a movable carrier 100, and a plurality of antenna tags 400 that are disposed on the court C and that are spaced apart from each other. The blade module 300 can be charged from the charging station 200, and the movable carrier 100 is capable of having the blade module 300 assembled thereon from the charging station 200 for being jointly defined as a weeder robot 300*a*. In other words, the weeder robot 300*a* of the present embodiment includes the movable carrier 100 and the blade module 300 that is (replaceably) assembled to the movable carrier 100.

It should be noted that each of the movable carrier 100 and the blade module 300 in the present embodiment has a rechargeable battery therein, and the rechargeable battery of the blade module 300 can be used to support the operation of the movable carrier 100, but the present disclosure is not limited thereto. The charging station 200 can be provided with a battery therein, and when the power of the movable carrier 100 is insufficient, the battery in the charging station 200 can be used to replace the rechargeable battery of the movable carrier 100.

Moreover, in the present embodiment, a quantity of the blade module 300 in the environment maintenance system 1000 can be more than one. Specifically, the weeder robot 300*a* is operated by using one of the blade modules 300, and another one of the blade modules 300 can be charged in the charging station 200, so that when the power of the blade modules 300 of the weeder robot 300*a* is insufficient, the blade module 300 in the charging station 200 can be used to replace that of the weeder robot 300*a* for enabling the weeder robot 300*a* to be continuously operated.

In addition, the weeder robot 300*a* in the present embodiment is described in cooperation with the charging station 200, but the present disclosure is not limited thereto. For example, in other embodiments of the present disclosure not shown in the drawings, the weeder robot 300*a* can be independently used (e.g., sold) or can be used in cooperation with other components; or, the blade module 300 can be irreplaceably assembled to the movable carrier 100.

In the present embodiment, the antenna tags 400 can be disposed on any positions of the court C according to practical requirements so as to jointly define a maintenance boundary 401 that can be regarded as an electrical fence, where the weeder robot 300*a* (or the movable carrier 100) is not in contact with the maintenance boundary 401. In other words, the weeder robot 300*a* (or the movable carrier 100) cannot move across the maintenance boundary 401 defined by the antenna tags 400.

Moreover, any one of the antenna tags 400 provided by the present embodiment can be worn on an animal D (e.g., a pet) that needs to be away from the weeder robot 300*a*, thereby effectively preventing the weeder robot 300*a* from harming the animal D.

When the weeder robot 300*a* (or the movable carrier 100) is located adjacent to at least one of the antenna tags 400, a true position of the weeder robot 300*a* (or the movable carrier 100) can be calculated by the at least one of the antenna tags 400.

It should be noted that the environment maintenance system 1000 in the present embodiment is provided with the antenna tags 400, but the present disclosure is not limited thereto. For example, in other embodiments of the present disclosure not shown in the drawings, the antenna tags 400 can be omitted or can be replaced by other components.

The movable carrier 100 includes a control module 1 electrically coupled to the blade module 300 assembled therein, a map creating module 2 electrically coupled to the control module 1, and a storage unit 3 that is electrically coupled to the control module 1. The storage unit 3 is provided to store a built-in information and information generated from the map creating module 2. The map creating module 2 includes an infrared unit 21 and a vision sensing unit 22 (hereafter can be referred to as a computer vision sensing unit 22) that is in cooperation with the infrared unit 21.

Figure 4:
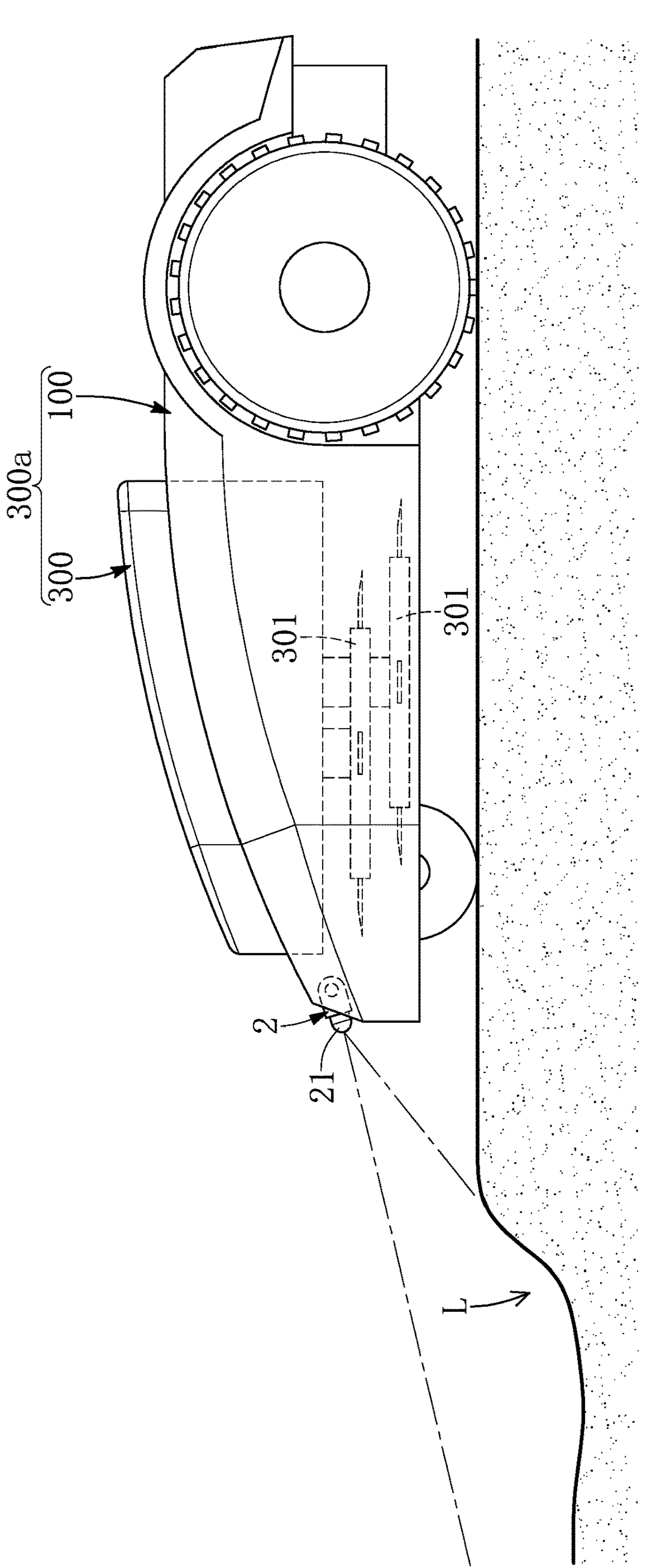
FIG. 4 is a schematic planar view showing the weeder robot of FIG. 1 that detects a topography of environment in a court.
Figure 5:
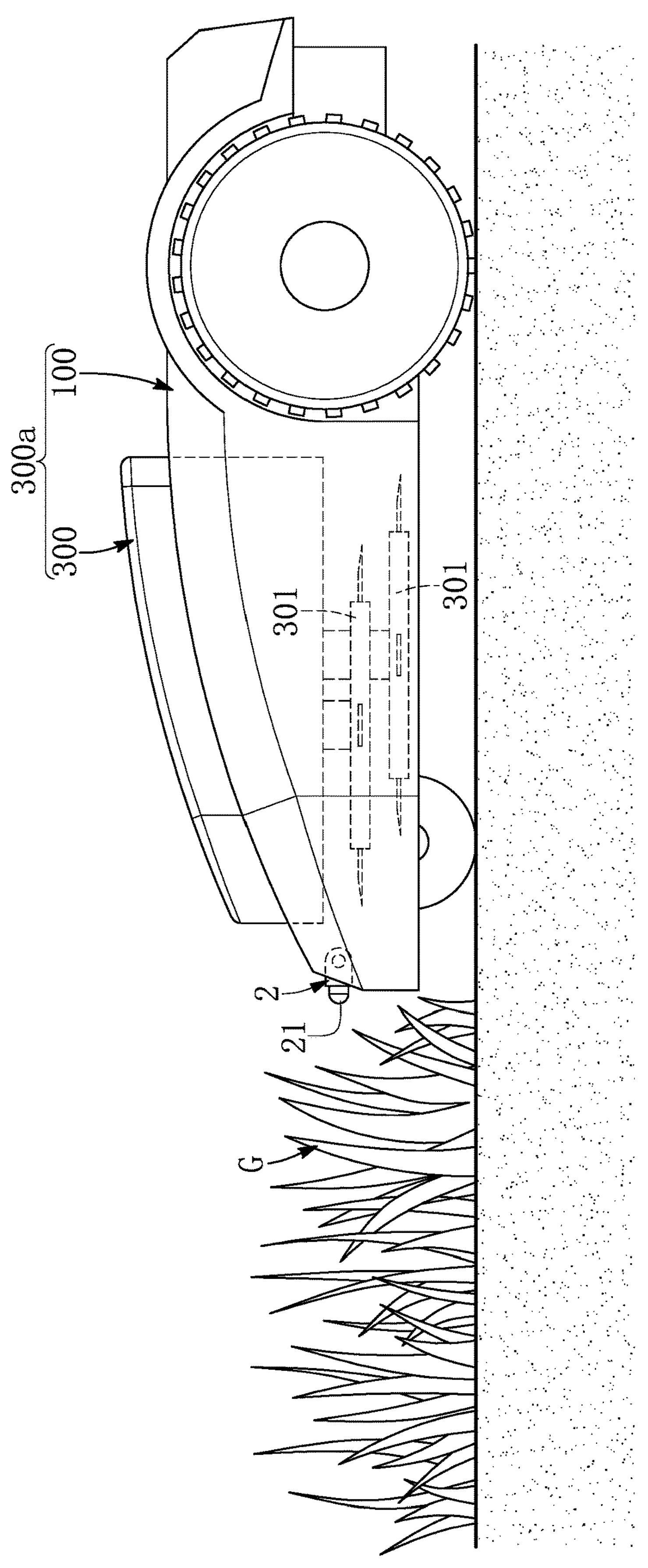
FIG. 5 is a schematic planar view showing the weeder robot that detects heights of objects in a court.

Specifically, the infrared unit 21 is configured to emit an infrared light in a predetermined area 211 and is configured to receive the infrared light reflected from the predetermined area 211, and the vision sensing unit 22 is configured to obtain an image information in a non-contact manner. Moreover, the map creating module 2 is capable of determining a topography of environment (as shown in FIG. 4) and heights of objects (as shown in FIG. 5) in the predetermined area 211 through the cooperation between the infrared light received by the infrared unit 21 and the image information obtained by the vision sensing unit 22.

In summary, when the movable carrier 100 is moved in the court C according to a predetermined schedule, the map creating module 2 is configured to generate a three-dimensional (3D) court map corresponding to the court C through the cooperation between the infrared unit 21 and the vision sensing unit 22. Accordingly, the movable carrier 100 (or the weeder robot 300*a*) in the present embodiment can generate the 3D court map in the non-contact manner (e.g., an optical manner), thereby effectively preventing the movable carrier 100 (or the weeder robot 300*a*) from damaging objects (e.g., seedlings P) that are located in the court C and that are under protection.

Specifically, as shown in FIG. 1 to FIG. 5, the infrared unit 21 is rotatably assembled to the movable carrier 100, thereby allowing the infrared unit 21 to be rotated at a suitable angle for meeting different detecting requirements (e.g., a detection for the topography of the environment or a detection for the heights of the objects).

Specifically, when the map creating module 2 is operated to detect the topography of the environment, the infrared unit 21 emits the infrared light by a first angle. For example, the infrared light emitted from the infrared unit 21 can be horizontal or can have an angle of depression for detecting the topography corresponding to a moving path of the movable carrier 100, thereby preventing the weeder robot 300*a* from falling into a concave ground L in the court C.

Moreover, when the map creating module 2 is operated to detect the heights of the objects, the infrared unit 21 emits the infrared light by a second angle that is different first angle. For example, the infrared light emitted from the infrared unit 21 can be horizontal or can have an angle of elevation for detecting the heights and widths of the objects located on the moving path of the movable carrier 100 for distinguish the objects (e.g., the lawn G to be weeded, the seedlings P under protection, or an unhackable fence F), thereby preventing the weeder robot 300*a* from harming the seedlings P and cutting the fence F to have a damage.

In the present embodiment, the vision sensing unit 22 preferably includes at least two of an image sensing mechanism, a simultaneous localization and mapping (SLAM) mechanism, an image segmentation mechanism, a structural light sensing mechanism, a mmWave sensing mechanism, an ultrasonic sensing mechanism, a driver monitoring system (DMS) mechanism, a time of flight (TOF) mechanism, and a stereo vision sensing mechanism. Accordingly, the image information obtained by the vision sensing unit 22 can be more accurate through the at least two of the above mechanisms that respectively have different sensing properties and that are complementary cooperated with each other.

For example, the vision sensing unit 22 can include one of the image sensing mechanism, the SLAM mechanism, the image segmentation mechanism, and the structural light sensing mechanism, and the vision sensing unit 22 further includes one of the mmWave sensing mechanism, the ultrasonic sensing mechanism, and the DMS mechanism, but the present disclosure is not limited thereto.

In summary, when the weeder robot 300*a* performs a maintenance process in the court C according to the predetermined schedule, the control module 1 is configured to drive the blade module 300 to weed a portion of the lawn G higher than a predetermined height according to the 3D court map. Moreover, after the weeder robot 300*a* performs the maintenance process, the movable carrier 100 (or the weeder robot 300*a*) is moved in the court C to update the 3D court map. Or, the weeder robot 300*a* can be configured to perform a patrol process in the court C according to the predetermined schedule, thereby synchronously updating the 3D court map.

Specifically, after each time the movable carrier 100 (or the weeder robot 300*a*) is moved around the court C, the 3D court map can be generated or updated, and the objects (e.g., the seedlings P and the fence F) and the topography (e.g., the concave ground L) having an avoiding requirement for the maintenance process of the weeder robot 300*a* can be recorded, thereby facilitating a next maintenance process performed by the weeder robot 300*a* and simultaneously recording a growth of the seedlings P.

In other words, the movable carrier 100 includes a wireless connection unit 4 configured to be electrically coupled to an external apparatus 500 (e.g., a smart phone), so that the 3D court map is editable from the external apparatus 500. Specifically, after the 3D court map is generated, a user can edit and amend the 3D court map for further confirming the objects and the topography in the court C that are provided with the avoiding requirement.

Figure 6:
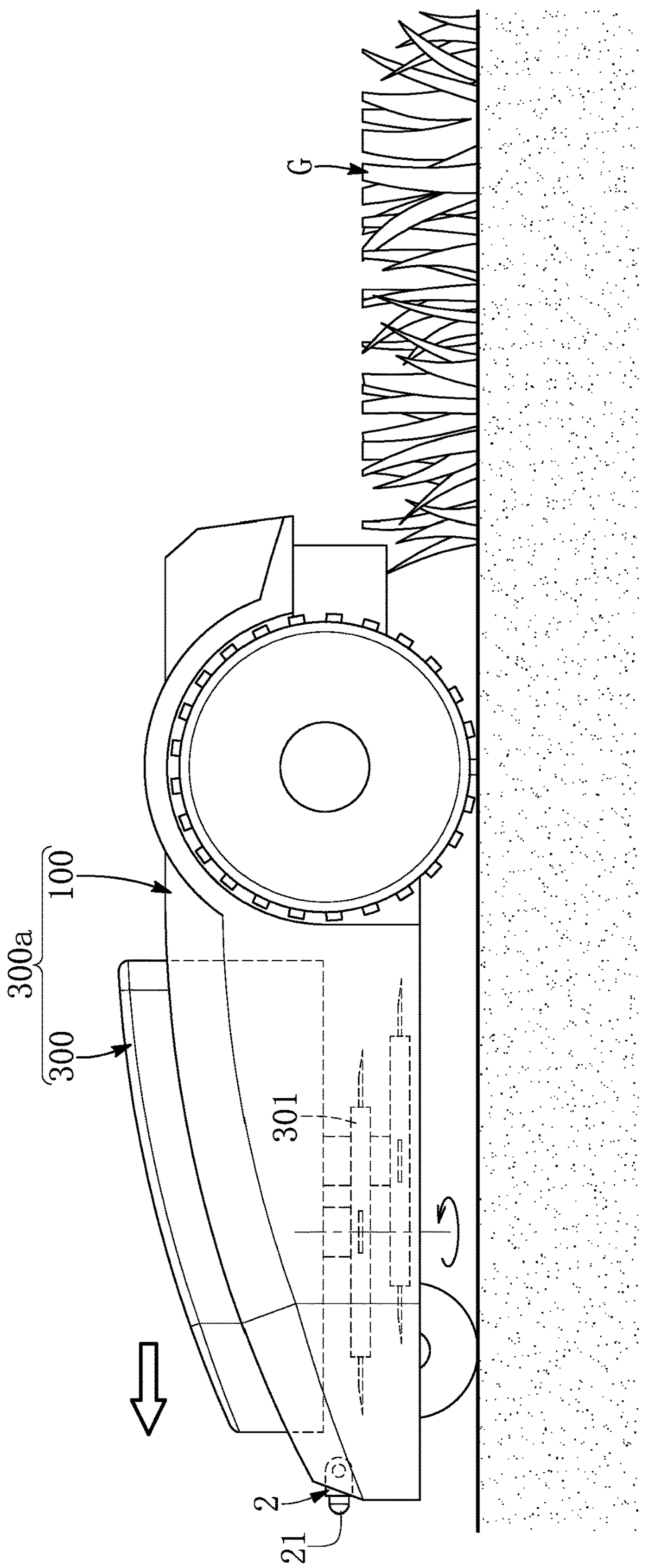
FIG. 6 is a schematic planar view showing the weeder robot that weeds a lawn by one of blades.
Figure 7:
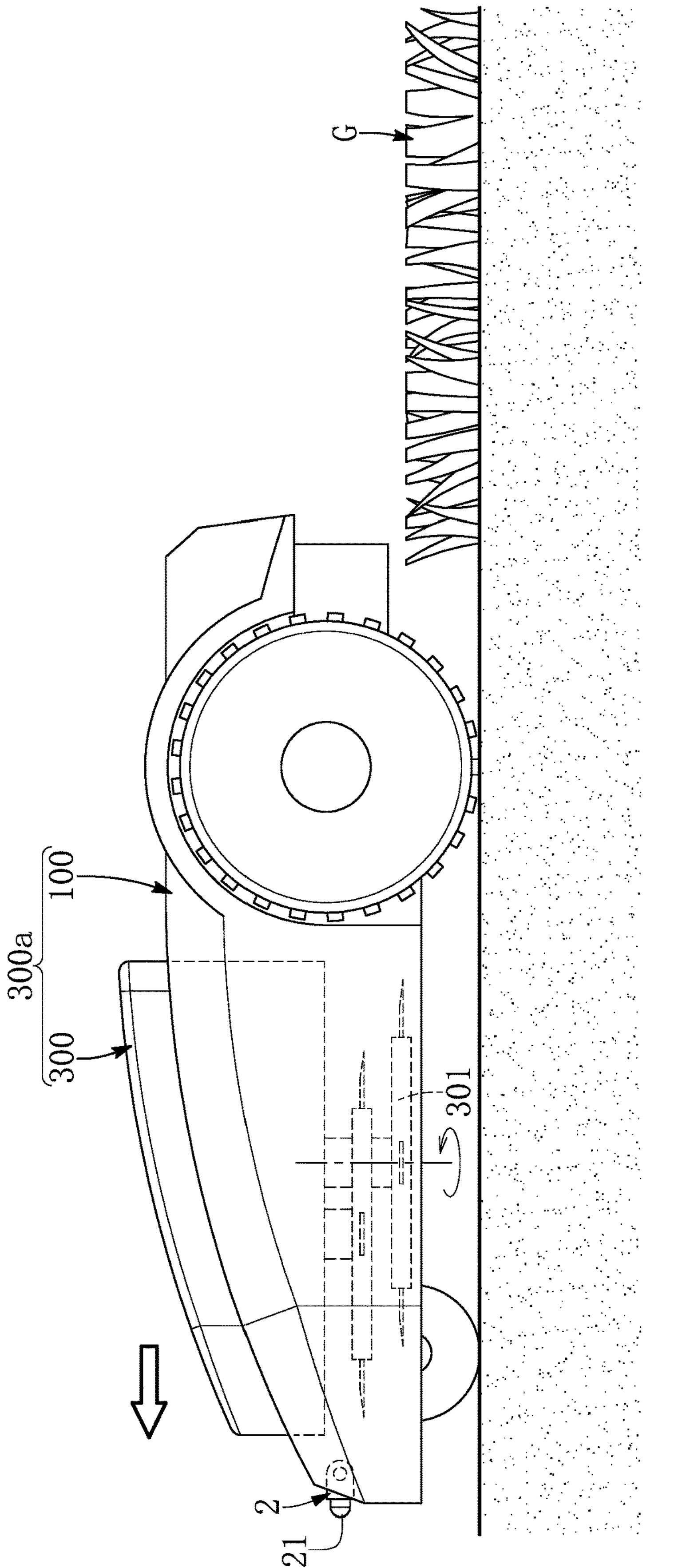
FIG. 7 is a schematic planar view showing the weeder robot that weeds the lawn by another one of blades.

Since the predetermined height being set in the maintenance process of the weeder robot 300*a* can determine a touch feeling of the lawn G, the blade module 300 preferably includes a plurality of blades 301 located at different heights for meeting requirements of different touch feeling of the lawn G. As shown in FIG. 5 to FIG. 7, the control module 1 is configured to select one of the blades 301 to perform the maintenance process according to the predetermined height.

Figure 8:
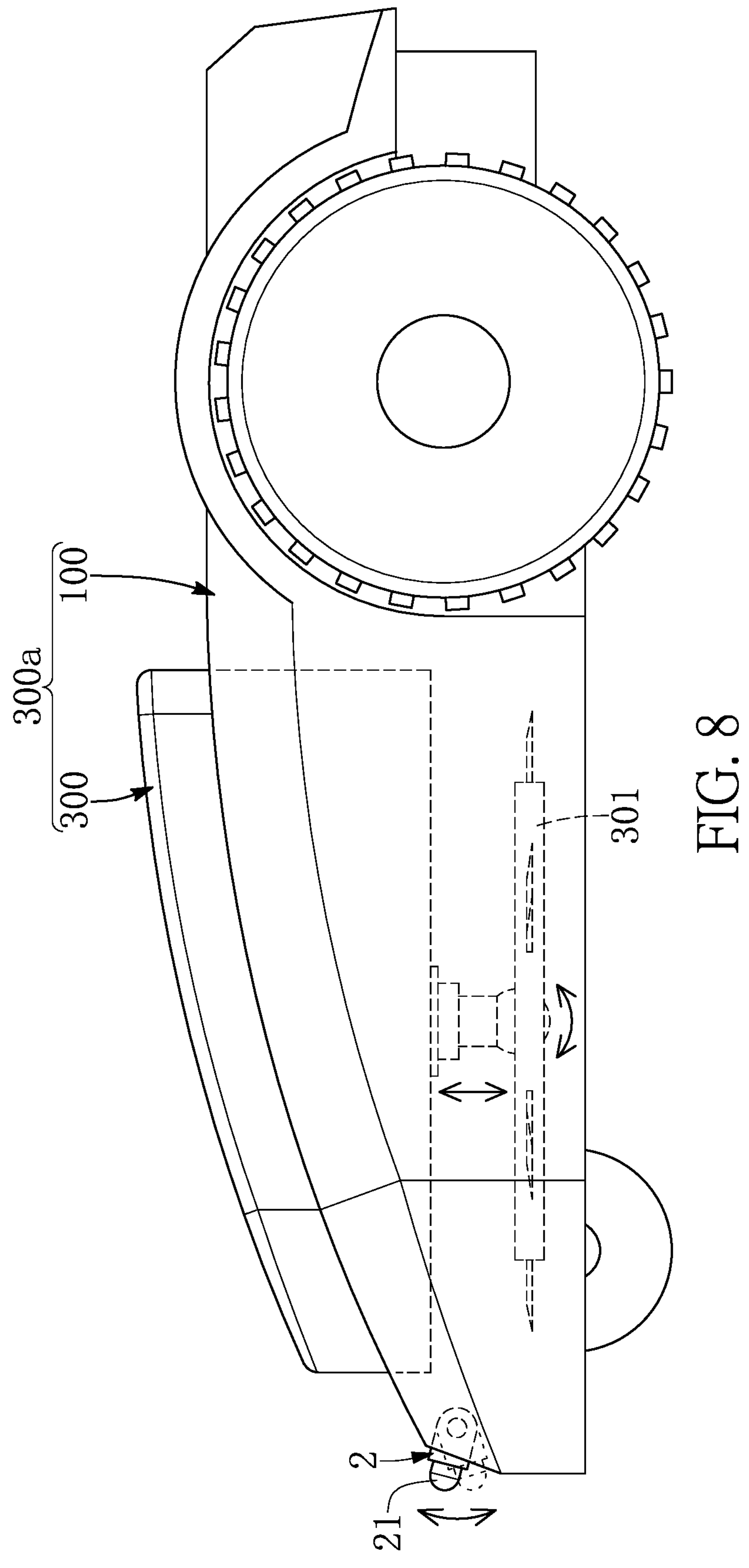
FIG. 8 is a schematic planar view showing the weeder robot that has a blade module in another configuration.

Specifically, the control module 1 can be configured to adjust a weeding orientation of the blade module 300 (e.g., a height and an angle of at least one of the blades 301) according to predetermined height, thereby meeting the predetermined heights of different values. It should be noted that the blade module 300 shown in FIG. 5 to FIG. 7 includes multiple of the blades 301, but the blade module 300 can only include one of the blades 301 (as shown in FIG. 8) according to design requirements.

In addition, the movable carrier 100 includes a humidity sensor 5 electrically coupled to the control module 1. The humidity sensor 5 is configured to detect an environment humidity of the court C. Specifically, when the environment humidity is greater than a first humidity that represents impending rain, the weeder robot 300*a* is stopped to perform the maintenance process, but the present disclosure is not limited thereto. For example, in other embodiments of the present disclosure not shown in the drawings, the humidity sensor 5 can be omitted or can be replaced by other components according to design requirements.

Moreover, the environment maintenance system 100 can further include a monitor 600 for being electrically coupled to a local area network B1 of the building B. Moreover, the movable carrier 100 can be electrically coupled to the local area network B1 through the wireless connection unit 4 thereof for receiving information of the court C obtained from the monitor 600 or receiving a weather information from an internet, thereby providing a judging basis for whether the weeder robot 300*a* performs the maintenance process. In addition, the weeder robot 300*a* can report its matters to be repaired through the local area network B1 or the charging station 200.

Second Embodiment

Figure 9:
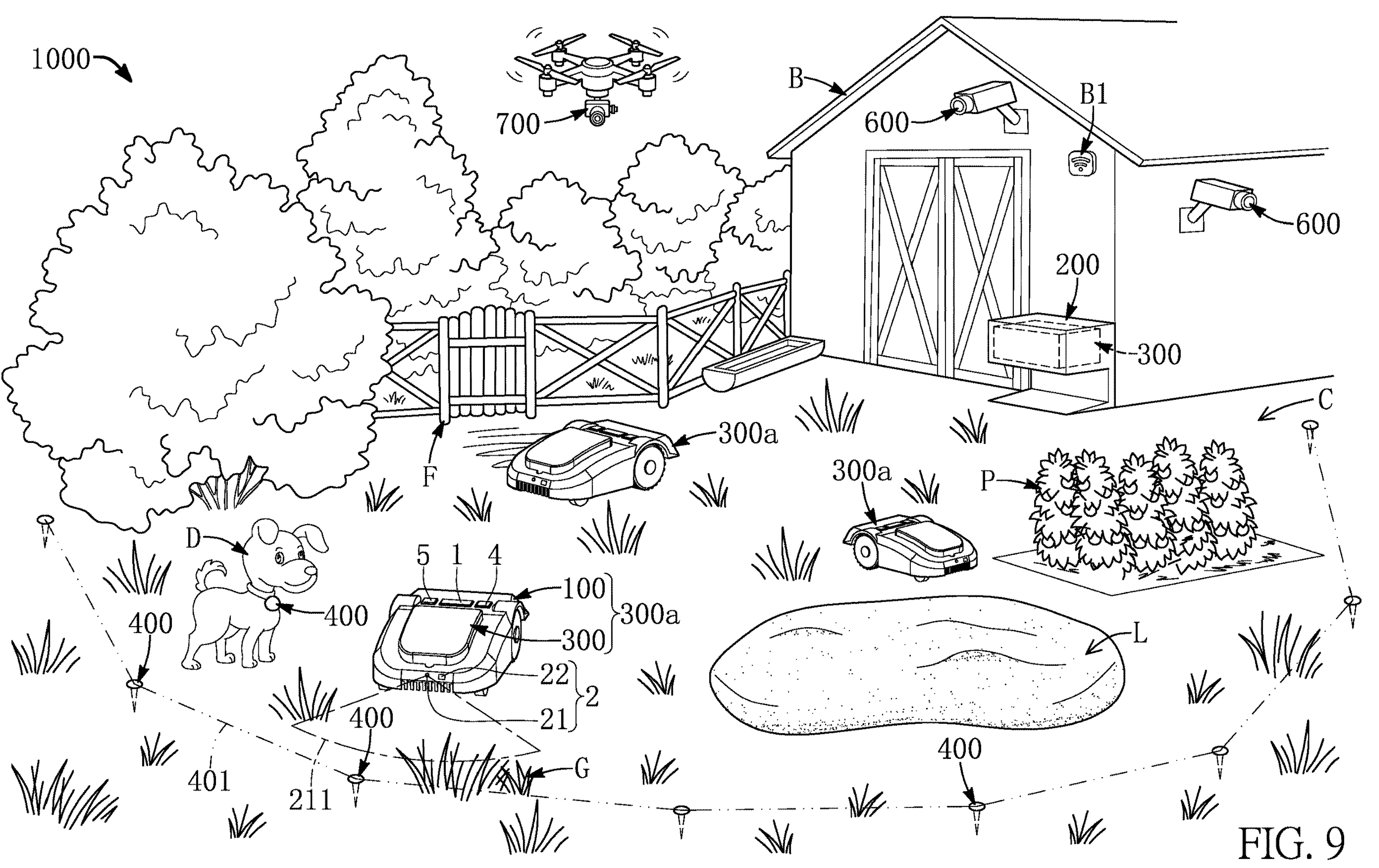
FIG. 9 is a schematic perspective view of the environment maintenance system according to a second embodiment of the present disclosure.

Referring to FIG. 9, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, a quantity of the weeder robot 300*a* in the environment maintenance system 1000 is more than one. Specifically, regions on the 3D court map to be weeded can be defined and distributed according to electricity of the weeder robots 300*a* (e.g., the weeder robot 300*a* having higher electricity is planned to weed a larger one of the regions on the 3D court map to be weeded), and the weeder robots 300*a* are configured to respectively weed different portions of the lawn G that are higher than the predetermined height and that respectively correspond to the regions on the 3D court map to be weeded, thereby increasing the maintenance efficiency of the court C.

Moreover, any one of the weeder robots 300*a* can be used to perform the patrol process according to requirements, thereby being cooperated with the monitor 600 or other devices to jointly carry out a home security protection. For example, the environment maintenance system 1000 can further include a drone 700. A surveillance from ground provided by any one of the weeder robots 300*a* can be in cooperation with a surveillance from fixed place provided by the monitor 600 and a surveillance from sky provided by the drone 700, thereby carrying out a comprehensive home security protection.

Third Embodiment

Figure 10:
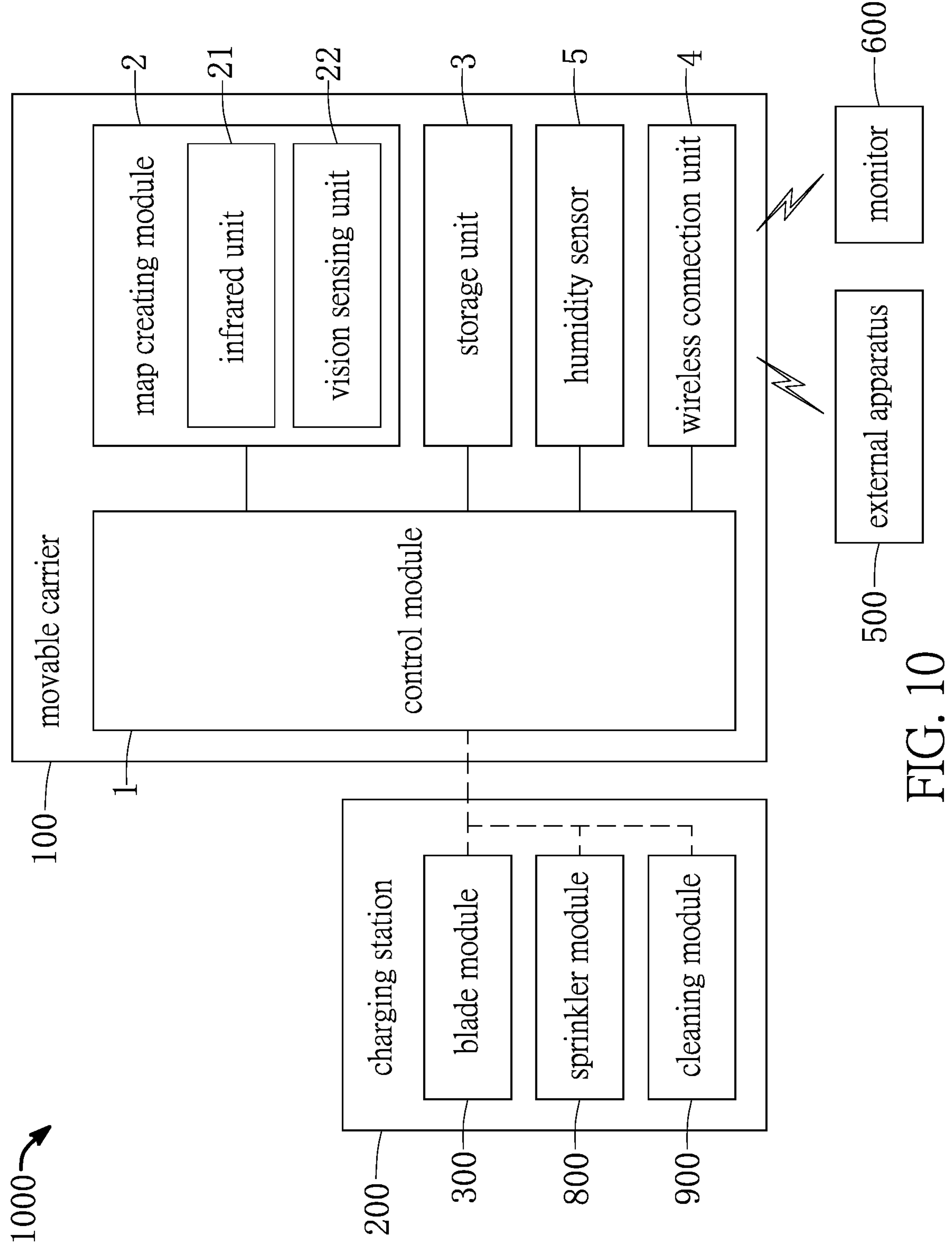
FIG. 10 is a schematic functional block diagram of the environment maintenance system according to a third embodiment of the present disclosure.
Figure 11:
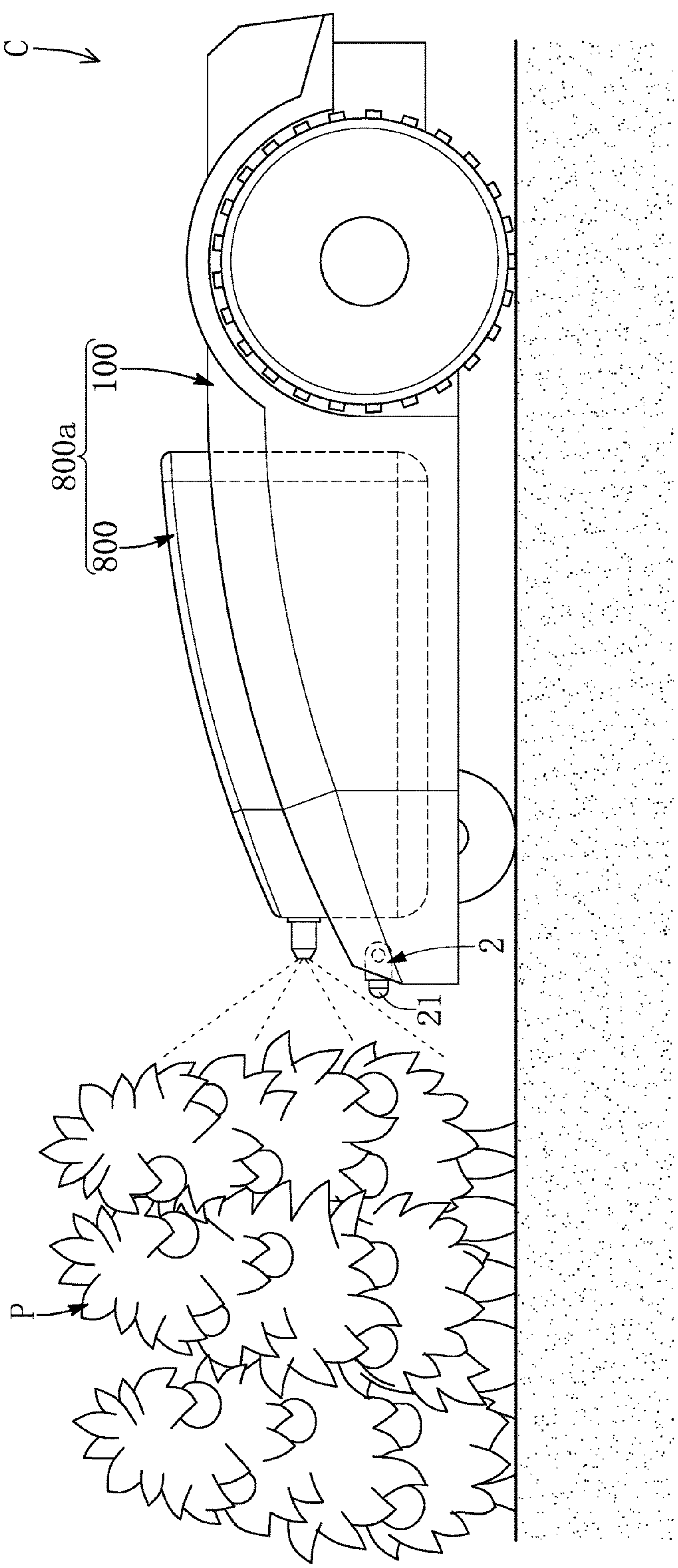
FIG. 11 is a schematic planar view of a sprinkler robot according to the third embodiment of the present disclosure.
Figure 12:
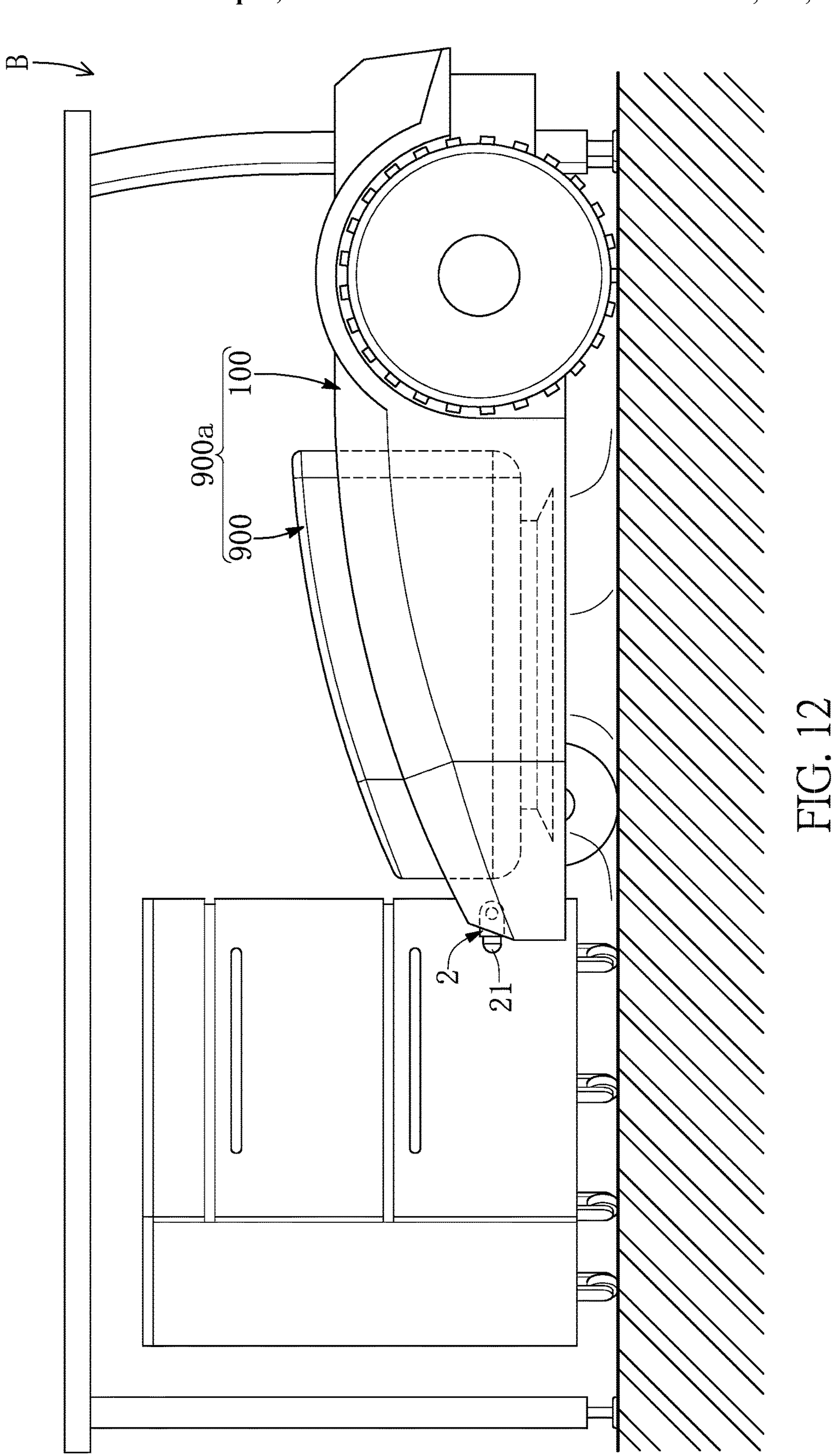
FIG. 12 is a schematic planar view of a robot vacuum cleaner according to the third embodiment of the present disclosure.

Referring to FIG. 10 to FIG. 12, a third embodiment of the present disclosure, which is similar to the first and second embodiments of the present disclosure, is provided. For the sake of brevity, descriptions of the same components in the first to third embodiments of the present disclosure will be omitted herein, and the following description only discloses different features among the first to third embodiments.

In the present embodiment, the environment maintenance system 1000 further includes a sprinkler module 800 and a cleaning module 900. Each of the sprinkler module 800 and the cleaning module 900 is disposed in and charged from the charging station 200, but the present disclosure is not limited thereto. For example, in other embodiments of the present disclosure not shown in the drawings, the sprinkler module 800 and the cleaning module 900 can be omitted or can be replaced by other modules according to design requirements.

Specifically, when the environment humidity of the court C obtained from the moveable carrier 100 is less than a second humidity that represents excessive dryness, the movable carrier 100 is operated to replace the blade module 300 with the sprinkler module 800 from the charging station 200 for being jointly defined as a sprinkler robot 800*a*, where the sprinkler module is electrically coupled to the control module. Moreover, the sprinkler robot 800*a* is configured to perform a sprinkling process to the lawn G in the court C through the sprinkler module 800.

The movable carrier 100 can be configured to replace the blade module 300 with the cleaning module 900 from the charging station 200 for being jointly defined as a robot vacuum cleaner 900*a*. Moreover, the cleaning module 900 of the robot vacuum cleaner 900*a* is electrically coupled to the control module 1, and the robot vacuum cleaner 900*a* is configured to perform a cleaning process in the building B through the cleaning module 900.

In summary, the weeder robot 300*a*, the sprinkler robot 800*a*, and the robot vacuum cleaner 900*a* of the environment maintenance system 1000 in the present embodiment are provided by sharing the movable carrier 100, such that when one of the blade module 300, the sprinkler module 800, and the cleaning module 900 is charged in the charging station 200, the movable carrier 100 can be operated in cooperation with another one of the blade module 300, the sprinkler module 800, and the cleaning module 900, thereby preventing the movable carrier 100 from having an idle time. Accordingly, the maintenance of the court C and an interior of the building B can be overall planned by using the environment maintenance system 1000.

Beneficial Effects of the Embodiments

In conclusion, the movable carrier (or the weeder robot) in the present disclosure can generate the 3D court map in the non-contact manner (e.g., the optical manner), thereby effectively preventing the movable carrier (or the weeder robot) from damaging objects (e.g., seedlings) that are located in the court and that are under protection.

Moreover, the weeder robot provided by the present disclosure can be used to perform the patrol process according to requirements, thereby being cooperated with the monitor or other devices (e.g., a drone) to jointly carry out a home security protection.

In addition, the weeder robot, the sprinkler robot, and the robot vacuum cleaner of the environment maintenance system in the present disclosure are provided by sharing the movable carrier, such that the movable carrier can be selectively cooperated with one of the blade module, the sprinkler module, and the cleaning module, thereby preventing the movable carrier from having an idle time. Moreover, the maintenance of the court and an interior of the building can be overall planned by using the environment maintenance system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An environment maintenance system for being applied to a building and a court that is located around the building, the environment maintenance system comprising:
- a charging station;
- a blade module disposed in and charged from the charging station; and
- a movable carrier capable of having the blade module assembled thereon from the charging station, so as to jointly define as a weeder robot, wherein the movable carrier includes:
  - a control module electrically coupled to the blade module; and
  - a map creating module electrically coupled to the control module and including:
    - an infrared unit configured to emit infrared light in a predetermined area and configured to receive the infrared light reflected from the predetermined area; and
    - a vision sensing unit configured to obtain an image information in a non-contact manner, wherein the map creating module is capable of determining a topography of environment and heights of objects in the predetermined area through a cooperation between the infrared light received by the infrared unit and the image information obtained by the vision sensing unit;
  - wherein, when the movable carrier is moved in the court according to a predetermined schedule, the map creating module is configured to generate a three-dimensional (3D) court map corresponding to the court through the cooperation between the infrared unit and the vision sensing unit;
- wherein, when the weeder robot performs a maintenance process in the court according to the predetermined schedule, the control module is configured to drive the blade module to weed a portion of a lawn higher than a predetermined height according to the 3D court map;
- wherein the blade module includes a plurality of blades located at different heights, and the control module is configured to select one of the blades to perform the maintenance process according to the predetermined height.

2. The environment maintenance system according to claim 1, wherein the movable carrier includes a humidity sensor electrically coupled to the control module and configured to detect an environment humidity of the court, and wherein, when the environment humidity is greater than a first humidity that represents impending rain, the weeder robot is stopped to perform the maintenance process.

3. The environment maintenance system according to claim 2, further comprising a sprinkler module disposed in and charged from the charging station, wherein, when the environment humidity is less than a second humidity that represents excessive dryness, the movable carrier is operated to replace the blade module with the sprinkler module at the charging station, so as to jointly define as a sprinkler robot, where the sprinkler module is electrically coupled to the control module, and the sprinkler robot is configured to perform a sprinkling process to the lawn in the court through the sprinkler module.

4. The environment maintenance system according to claim 1, further comprising a cleaning module disposed in and charged from the charging station, wherein the movable carrier is configured to replace the blade module with the cleaning module from the charging station, so as to jointly define as a robot vacuum cleaner, where the cleaning module is electrically coupled to the control module, and the robot vacuum cleaner is configured to perform a cleaning process in the building through the cleaning module.

5. The environment maintenance system according to claim 1, further comprising a monitor for being electrically coupled to a local area network of the building, wherein the movable carrier includes a wireless connection unit configured to be electrically coupled to the local area network for receiving information of the court obtained from the monitor.

6. The environment maintenance system according to claim 1, wherein the movable carrier includes a wireless connection unit configured to be electrically coupled to an external apparatus, so that the 3D court map is editable from the external apparatus.

7. The environment maintenance system according to claim 1, wherein a quantity of the weeder robot in the environment maintenance system is more than one, and wherein, regions on the 3D court map to be weeded are defined and distributed according to electricity of the weeder robots, and the weeder robots are configured to respectively weed different portions of the lawn that are higher than the predetermined height and that respectively correspond to the regions on the 3D court map to be weeded.

8. The environment maintenance system according to claim 1, further comprising a plurality of antenna tags disposed on the court and spaced apart from each other, wherein the antenna tags jointly define a maintenance boundary, and the weeder robot is not in contact with the maintenance boundary.

9. The environment maintenance system according to claim 1, wherein, after the weeder robot performs the maintenance process, the movable carrier moves in the court for updating the 3D court map.

10. The environment maintenance system according to claim 1, wherein the weeder robot is configured to perform a patrol process in the court according to the predetermined schedule, such as to synchronously update the 3D court map.

11. A weeder robot, comprising:
- a movable carrier including:
  - a control module; and
  - a map creating module electrically coupled to the control module and including:
    - an infrared unit configured to emit infrared light in a predetermined area and configured to receive the infrared light reflected from the predetermined area; and
    - a vision sensing unit configured to obtain an image information in a non-contact manner, wherein the map creating module is capable of determining a topography of environment and heights of objects in the predetermined area through a cooperation between the infrared light received by the infrared unit and the image information obtained by the vision sensing unit;
  - wherein, when the movable carrier is moved in a court according to a predetermined schedule, the map creating module is configured to generate a three-dimensional (3D) court map corresponding to the court through the cooperation between the infrared unit and the vision sensing unit; and
- a blade module assembled to the movable carrier and electrically coupled to the control module;
- wherein, when the weeder robot performs a maintenance process in the court according to the predetermined schedule, the control module is configured to drive the blade module to weed a portion of a lawn higher than a predetermined height according to the 3D court map;
- wherein the blade module includes a plurality of blades located at different heights, and the control module is configured to select one of the blades to perform the maintenance process according to the predetermined height.

12. The weeder robot according to claim 11, wherein, after the weeder robot performs the maintenance process, the movable carrier is moved in the court to update the 3D court map.

13. The weeder robot according to claim 11, wherein the weeder robot is configured to perform a patrol process in the court according to the predetermined schedule, thereby synchronously updating the 3D court map.

14. The weeder robot according to claim 11, wherein the control module is configured to adjust a weeding orientation of the blade module according to predetermined height.

15. The weeder robot according to claim 11, wherein the infrared unit is rotatably assembled to the movable carrier, wherein, when the map creating module is operated to detect the topography of the environment, the infrared unit emits the infrared light by a first angle, and wherein, when the map creating module is operated to detect the heights of the objects, the infrared unit emits the infrared light by a second angle that is different first angle.

16. The weeder robot according to claim 11, wherein the vision sensing unit includes at least two of an image sensing mechanism, a simultaneous localization and mapping (SLAM) mechanism, an image segmentation mechanism, a structural light sensing mechanism, a mmWave sensing mechanism, an ultrasonic sensing mechanism, a driver monitoring system (DMS) mechanism, a time of flight (TOF) mechanism, and a stereo vision sensing mechanism.

17. The weeder robot according to claim 11, wherein the vision sensing unit includes one of an image sensing mechanism, a simultaneous localization and mapping (SLAM) mechanism, an image segmentation mechanism, and a structural light sensing mechanism, and wherein the vision sensing unit further includes one of a mmWave sensing mechanism, an ultrasonic sensing mechanism, and a driver monitoring system (DMS) mechanism.

18. The weeder robot according to claim 11, wherein the movable carrier includes a humidity sensor electrically coupled to the control module and configured to detect an environment humidity of the court, and wherein, when the environment humidity is greater than a first humidity that represents impending rain, the weeder robot is stopped to perform the maintenance process.

19. A weeder robot, comprising:
- a movable carrier including:

a control module; and a map creating module electrically coupled to the control module and including:

an infrared unit configured to emit infrared light in a predetermined area and configured to receive the infrared light reflected from the predetermined area; and a vision sensing unit configured to obtain an image information in a non-contact manner, wherein the map creating module is capable of determining a topography of environment and heights of objects in the predetermined area through a cooperation between the infrared light received by the infrared unit and the image information obtained by the vision sensing unit;

wherein, when the movable carrier is moved in a court according to a predetermined schedule, the map creating module is configured to generate a three-dimensional (3D) court map corresponding to the court through the cooperation between the infrared unit and the vision sensing unit; and a blade module assembled to the movable carrier and electrically coupled to the control module;

wherein, when the weeder robot performs a maintenance process in the court according to the predetermined schedule, the control module is configured to drive the blade module to weed a portion of a lawn higher than a predetermined height according to the 3D court map;

wherein the control module is configured to adjust a weeding orientation of the blade module according to predetermined height.

* * * * *